Patented Sept. 15, 1925.

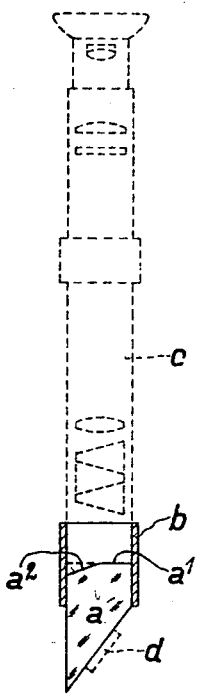

1,553,786

UNITED STATES PATENT OFFICE.

FRIEDRICH LÖWE, OF JENA, GERMANY, ASSIGNOR TO THE FIRM OF CARL ZIESS, OF JENA, GERMANY.

PRISM FOR DIPPING REFRACTOMETERS.

Application filed August 16, 1923. Serial No. 657,763.

*To all whom it may concern:*

Be it known that I, FRIEDRICH LÖWE, a citizen of Germany, and residing at Jena, Germany, have invented a new and useful Prism for Dipping Refractometers (for which I have filed an application in Germany on October 7, 1922), of which the following is a specification.

In order to increase the measuring range of dipping refractometers they are provided with a large number of interchangeable prisms, whose refractive angles and refractive indices are graduated correspondingly. However, when interchanging the prisms, the difficulty arises that owing to the high magnification of the telescope contained in the instrument the slightest error in laying a prism against the respective stop of the refractometer tube acts as a deviation of the zero point of the scale provided for in the field of view of the telescope. It is therefore necessary to examine each time after the insertion of a prism whether the same exactly occupies the prescribed position or by which amount it is to be adjusted. This adjustment is made by a trial measurement with an object having a known refractive index. For certain, definite refractive indices there are suitable solid bodies which may serve as test objects for this trial measurement. For another refractive index it is possible to use to advantage for this purpose distilled water which may at any time easily be obtained again. In addition, prisms of such refractive index are used that their position adjustment could hitherto only be examined by means of special solutions, i. e., neither by means of solid bodies nor plain liquids as, e. g. distilled water. However, the test with such special solutions is on the one hand inconvenient because their preparation always takes a comparatively large amount of time and on the other hand it is comparatively uncertain.

According to the invention it is possible to avoid the use of such solutions for examining the position of the prisms, viz. by a special modification of the respective prisms in such a way that their surfaces, which are to face the telescope, consist of two faces inclined to each other, so that either to each of these prisms on the side facing the telescope there is cemented a supplmentary prism covering a part of the light exit surface, or the latter surface is ground off correspondingly which latter modification is disclosed in the drawing. In that case the luminous rays traverse one part of the light exit surface in the same way as hitherto, whilst the rays passing through the other part experience a deviation relatively to the rays traversing the first partial surface, i. e. the inclination of the later part of the light exit surface to the first one is so chosen that the rays traversing this latter part afford for adjusting purposes the measurement of substances, the refractive indices of which lie far beyond the measuring range which the prism possesses in combination with the first-named partial surface, so that the adjustment of a prism can be carried out with a substance, both convenient in use and acting in the usual way, e. g. using a solid body, even if the respective prism be destined for measuring substances, whose refractive indices differ by a comparatively large amount from the refractive index of a body, the use of which is desired for the adjustment.

The annexed drawing shows as an example in a section a prism according to the invention in conjunction with a rafractometer (shown by dotted lines.)

The prism $a$ has a light exit surface consisting of the two parts $a^1$ and $a^2$, of which the former, $a^1$, serves for the measurement proper and the latter, $a^2$, for the adjustment. The prism is mounted in a tube $b$, by means of which it is to be slipped on the refractometer tube $c$. This prism is to be tested with a solid body which is, as usual, pressed against the light entrance surface of the prism $a$ in the shape of a small plate $d$ and by interposing a liquid of a sufficiently high refractive index, e. g. a drop of monobromide of naphthaline. In order to carry out the measurement proper, it is necessary to dip the prism in the usual way into the liquid, whose refractive index is to be determined.

If the prism $a$ be traversed from the entrance surface of the rays by a ray pencil, the latter, on emerging from the prism, is divided into two divergent partial pencils owing to the limitation of the prism, corresponding to the invention, by the surfaces $a^1$ and $a^2$ inclined to each other. The inclination of the two surfaces $a^1$ and $a^2$ has been so chosen that both with the measurement of certain substances and with the adjustment of the refractometer by means of certain other substances, which can be easily used, one of the partial pencils enters the field of view of the telescope, viz. always but one partial pencil, whilst the other one strikes the side-wall of the telescope. As already mentioned above, with the measurement the partial pencil, traversing the surface $a^1$, enters the field of view of the telescope and with the adjustment the one traversing the surface $a^2$.

The observation through the telescope takes place in the same way as in the refractometers with the known prisms. When adjusting one makes sure of the (visible) boundary line of the total reflexion traversing a certain definite division of the scale of the telescope and when measuring one reads off the position of the (visible) boundary line on the telescope scale, whereupon the refractive index sought can be gathered from a table.

I claim:

Prism destined to be used as the foremost member of a dipping refractometer, in which prism the surface, which is to face the instrument, consists of two parts inclined to each other.

FRIEDRICH LÖWE.